UNITED STATES PATENT OFFICE.

WILLIS H. POST, OF BATTLE CREEK, MICHIGAN, ASSIGNOR TO POSTUM CEREAL COMPANY, LIMITED, OF BATTLE CREEK, MICHIGAN.

BEVERAGE EXTRACT.

1,061,495.   Specification of Letters Patent.   Patented May 13, 1913.

No Drawing.   Application filed August 16, 1912.   Serial No. 715,355.

*To all whom it may concern:*

Be it known that I, WILLIS H. POST, of Battle Creek, Michigan, have invented a new and useful Improvement in Beverage Extracts, which invention is fully set forth in the following specification.

This invention relates to beverage extracts and has for its object the production of a readily soluble banana extract from roasted bananas and the preparation therefrom of a beverage which is nutritious and pleasant to the taste.

I have discovered as the result of numerous experiments that the pulp of bananas which have developed sugar in ripening is capable under proper treatment of yielding a soluble extract which is valuable in the preparation of a beverage, pleasant to the taste and somewhat resembling coffee. While I prefer to use in the preparation of the extract the yellow banana, I do not desire to be restricted to its exclusive use as other varieties no doubt will serve a like purpose such as the red variety or even plantains may be used without sacrificing all the benefits of my invention or discovery. I may also use the bananas without removing the skins, yet I prefer as stated above to use the pulp alone.

By way of illustrating one way in which the benefits of my invention may be secured, ripe bananas are selected and are decorticated. The pulp is then dried in any suitable manner and the product without admixture of any other ingredient is roasted, the operation being conducted at a temperature sufficient to caramelize the sugar contents. While the temperature may vary between comparatively wide limits, the best results are obtained when slight carbonizing takes place. This insures complete caramelizing and develops desirable flavors in the product while facilitating the next step of the operation which consists in extracting the product with hot or cold water to remove soluble extractive matter. The extraction is preferably conducted by percolation with water at about 50° to 60° C., thereby usually obtaining a clear solution. Should this not result in a clear solution, filtration is resorted to for this purpose. The clear aqueous solution is next concentrated by evaporation to a solid. This operation is preferably conducted in a vacuum pan or on a rotary drum *in vacuo*, the usual precaution well-known to those skilled in this art being taken to prevent injurious heating of the product. The dried extract is then comminuted or reduced to grains, powder, flakes or other subdivided form and is ready for packing. The resulting product is a beverage extract of extreme solubility in water, either hot or cold and when a teaspoonful of the extract is dissolved in a cup of hot water, solution is effected in one minute or less. The resulting beverage is very palatable and resembles the pleasant aroma of coffee.

What I claim is:—

1. A solid soluble extract for preparing beverages, consisting of extractive matter in soluble form of roasted bananas.

2. A solid soluble extract for preparing beverages, consisting of extractive matter in soluble form of decorticated roasted bananas.

3. A solid soluble extract for preparing beverages, consisting of soluble extractive matter in comminuted form derived from roasted banana pulp.

4. A solid soluble extract for preparing beverages, consisting of extractive matter in soluble form of bananas roasted to a degree sufficient to caramelize the sugar content.

5. A solid soluble extract for preparing beverages, consisting of soluble extractive matter in comminuted form derived from banana pulp roasted to a degree sufficient to caramelize the sugar content.

6. A solid soluble extract for preparing beverages, consisting of extractive matter in soluble form of partially carbonized bananas.

In testimony whereof I have signed this specification in the presence of two subscribing witnesses.

WILLIS H. POST.

Witnesses:
 VERN D. SUTTON,
 G. M. LA PIERRE.